United States Patent
Wajer

(10) Patent No.: US 8,179,302 B2
(45) Date of Patent: May 15, 2012

(54) APPARATUS FOR SHARING AN OMNIDIRECTIONAL ANTENNA BETWEEN AN IFF TRANSPONDER AND AN IFF INTERROGATOR

(75) Inventor: Frank Wajer, Delft (NL)

(73) Assignee: Thales Nederland B.V., Hengelo (NL)

( * ) Notice: Subject to any disclaimer, the term of this patent is extended or adjusted under 35 U.S.C. 154(b) by 0 days.

(21) Appl. No.: 12/794,956

(22) Filed: Jun. 7, 2010

(65) Prior Publication Data

US 2011/0102236 A1    May 5, 2011

(30) Foreign Application Priority Data

Jun. 5, 2009   (EP) .................................... 09162123

(51) Int. Cl.
*G01S 13/78* (2006.01)
(52) U.S. Cl. ................ 342/45; 342/13; 342/42
(58) Field of Classification Search .............. 342/13, 342/42–51
See application file for complete search history.

(56) References Cited

U.S. PATENT DOCUMENTS

| 4,104,629 | A | * | 8/1978 | Isbister et al. ................. 342/43 |
| 4,316,192 | A | * | 2/1982 | Acoraci ....................... 342/373 |
| 4,710,774 | A | * | 12/1987 | Gunny ......................... 342/455 |
| 6,222,480 | B1 | | 4/2001 | Kuntman et al. |
| 6,789,016 | B2 | | 9/2004 | Bayh et al. |
| 7,436,350 | B1 | | 10/2008 | Maloratsky et al. |

FOREIGN PATENT DOCUMENTS

WO     01/27654     4/2001

OTHER PUBLICATIONS

"Thales awarded Mode 5 IFF contract by French DGA", dated Mar. 20, 2007, 1 page.
"BAE Systems to Provide More AIMS Antennas for U.S. and Allied Navies", dated Aug. 4, 2003, pp. 1-2.

* cited by examiner

*Primary Examiner* — Timothy A Brainard
(74) *Attorney, Agent, or Firm* — Stroock & Stroock & Lavan LLP

(57) ABSTRACT

An apparatus for transmitting and receiving radio-frequency signals. including a cylindrical antenna array which has an omnidirectional channel; an IFF interrogator and an IFF transponder connected to the cylindrical antenna array; and a means for sharing the omnidirectional channel between the IFF interrogator and the IFF transponder.

12 Claims, 3 Drawing Sheets

APPARATUS FOR SHARING AN OMNIDIRECTIONAL ANTENNA BETWEEN AN IFF TRANSPONDER AND AN IFF INTERROGATOR

CROSS REFERENCE TO RELATED APPLICATION

Priority is claimed to European Patent Application No. 09162123.5, filed on Jun. 5, 2009, which is hereby incorporated by reference in its entirety.

FIELD OF THE INVENTION

The present invention relates to an apparatus for sharing an omnidirectional antenna between an IFF transponder and an IFF interrogator. The invention is applicable to both IFF (Identification Friend or Foe) and SSR (Secondary Surveillance Radar) systems, especially on naval ships.

BACKGROUND

Basically, the interrogator of an IFF system requires an antenna with a directional pattern, which can be directed in any direction. Additionally, correct IFF ISLS (Identification Friend or Foe with Interrogation Sidelobe Suppression) and IFF RSLS (Identification Friend or Foe with Receiver Sidelobe Suppression) capability of an IFF interrogator requires that the antenna has an omnidirectional pattern, which transmits in and receives from all directions. An antenna with an omnidirectional pattern is easily achievable. However, the placement of antennas is a problem on naval ships. The only place where the omnidirectional pattern is preserved after placement on the ship is the top of the main mast. Lower placement means blocking structures are in the way of the antenna, which spoil the omnidirectional pattern. The top of the main mast is the place where all antennas with similar demands require to be located. Therefore a tradeoff needs to be done. Usually the IFF antenna is the one that looses against the antennas of the ESM (Electronic Support Measures) or the communications antennas.

The transponder of an IFF system also requires an antenna with an omnidirectional pattern, which transmits in and receives from all directions. Thus, the same placement problem arises. To tackle the coverage problem, a typical transponder has antenna diversity capability. This may allow usage of two antennas for example. The transponder replies to interrogations on the antenna with the strongest received interrogation. Then, it is a problem to place two antennas which together provide omnidirectional coverage. This is usually achieved by placing one antenna on starboard and one antenna on port.

The BAE OE-120/UPX is a cylindrical antenna array, which can be used for IFF interrogators. Indeed, such a cylindrical antenna array can be placed around the mast, thus not requiring the highest position, while maintaining an omnidirectional pattern for correct ISLS functioning. Despite IFF interrogators using a BAE OE-120/UPX antenna providing the IFF ISLS or RSLS capability, they have no capability to also act as the antenna for the IFF transponder. As a consequence, separate antennas for the transponder are still required, thereby giving rise to placement problems.

SUMMARY OF THE INVENTION

To avoid the aforementioned placement problems, the present invention aims to provide an apparatus for sharing an omnidirectional antenna between an IFF interrogator and an IFF transponder, so that the antenna is momentarily used by the IFF interrogator and then completely available for the IFF transponder. At its most general, the present invention provides an apparatus for transmitting and receiving radio-frequency signals. The apparatus comprises a cylindrical antenna array, which comprises an omnidirectional channel. The apparatus comprises also an IFF interrogator and an IFF transponder connected to the cylindrical antenna array. The apparatus comprises means for sharing the omnidirectional channel between the IFF interrogator and the IFF transponder.

In a preferred embodiment, the means for sharing the omnidirectional channel between the IFF interrogator and the IFF transponder may comprise a radio-frequency switch arranged so that the omnidirectional channel is connected on transmit either to the IFF interrogator or to the IFF transponder. The radio-frequency switch may connect the omnidirectional channel on transmit to the IFF transponder by default. The IFF interrogator may provide a trigger signal to the radio-frequency switch to be connected on transmit to the omnidirectional channel. The radio-frequency switch may switch back to its default state when a predefined time has elapsed or the trigger signal has been removed.

Optionally, the means for sharing the omnidirectional channel between the IFF interrogator and the IFF transponder may comprise means for blanking the IFF interrogator when the omnidirectional channel is connected on transmit to the IFF transponder and for blanking the IFF to transponder when the omnidirectional channel is connected on transmit to the IFF interrogator.

Advantageously, the cylindrical antenna array may comprise a sum channel and a difference channel. The radio-frequency switch may be arranged so that the omnidirectional channel may be connected on transmit either to the IFF interrogator or to the IFF transponder. The sum and the difference channels may be connected directly to the IFF interrogator. The IFF interrogator may provide a trigger signal to the radio-frequency switch in order to transmit an ISLS pulse by virtue of the omnidirectional channel.

In another preferred embodiment, the means for sharing the omnidirectional channel between the IFF interrogator and the IFF transponder may comprise a diplexer arranged so that the omnidirectional channel is connected on receive to the IFF interrogator and to the IFF transponder. The diplexer may separate signals received by the omnidirectional channel between the IFF interrogator and the IFF transponder.

Advantageously, the cylindrical antenna array may comprise a sum channel and a difference channel. The diplexer may be arranged so that the omnidirectional channel may be connected on receive to the IFF interrogator and to the IFF transponder. The sum and the difference channels may be connected directly to the IFF interrogator. The signals received by the omnidirectional channel may be used for RSLS processing by the IFF interrogator.

Optionally, the means for sharing the omnidirectional channel between the IFF interrogator and the IFF transponder may comprise a first, a second and a third circulator. The first circulator may be arranged so as to isolate the RF switch from signals coming from the diplexer, while the second circulator may be arranged so as to isolate the RF switch from signals coming from the diplexer and while the third circulator may be arranged so as to isolate the RF switch from signals received by the omnidirectional channel. Alternatively, the first circulator may be arranged so as to isolate the diplexer from signal transmitted by the interrogator, while the second circulator may be arranged so as to isolate the diplexer from signals transmitted by the transponder and while the third circulator may be arranged so as to isolate the diplexer from signals transmitted by the interrogator or from signals transmitted by the transponder.

In yet another preferred embodiment, the means for sharing the omnidirectional channel between the IFF interrogator and the IFF transponder may comprise a diplexer arranged so that the omnidirectional channel is connected on receive and on transmit to the IFF interrogator and to the IFF transponder. The diplexer may separate signals received by omnidirectional channel between the IFF interrogator and the IFF transponder. The diplexer may merge signals transmitted by the IFF interrogator and the IFF transponder towards the omnidirectional channel. The means for sharing the omnidirectional channel between the IFF interrogator and the IFF transponder may also comprise a first and a second circulator. The first circulator may be arranged so as to isolate the IFF transponder from signals transmitted by the IFF interrogator, while the second circulator may isolate the IFF transponder from signals coming from the diplexer. Alternatively, the first circulator may be arranged so as to isolate the IFF interrogator from signals coming from the diplexer, while the second circulator may isolate the IFF interrogator from signals transmitted by the IFF transponder.

Advantageously, the cylindrical antenna array may comprise a sum channel and a difference channel. The diplexer may be arranged so that the omnidirectional channel is connected on receive and on transmit to the IFF interrogator and to the IFF transponder. The sum and the difference channels may be connected directly to the IFF interrogator. The signals received by the omnidirectional channel may be used for RSLS processing by the IFF interrogator. The signals transmitted by the IFF interrogator by virtue of the omnidirectional channel may include an ISLS pulse.

For example, the cylindrical antenna array may be arranged around the mast of a naval ship.

BRIEF DESCRIPTION OF THE DRAWINGS

Non-limiting examples of circuits for sharing the omnidirectional antenna according to the present invention are described below with reference to the accompanying drawings, in which.

DETAILED DESCRIPTION

Figure 1:
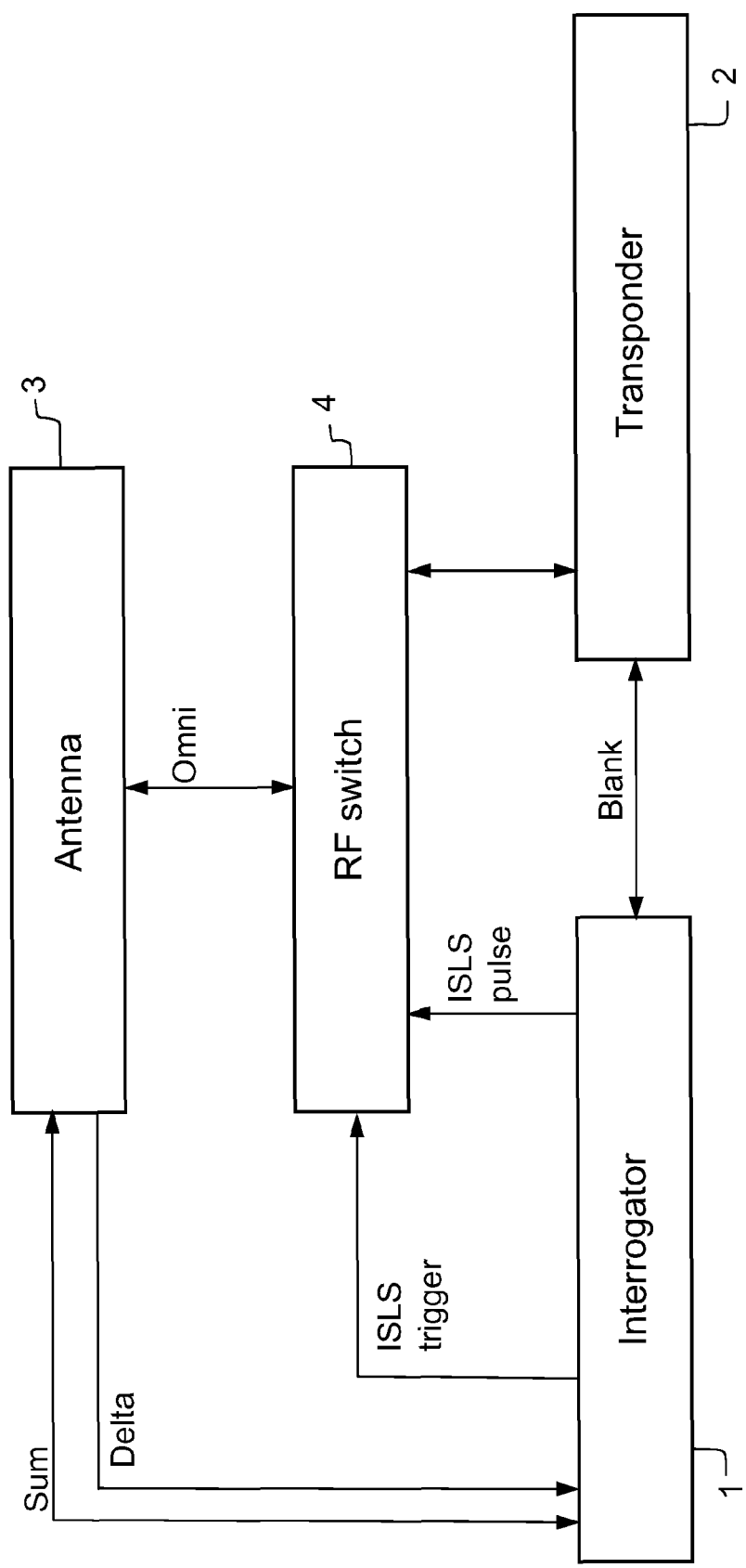
FIG. 1 schematically illustrates an exemplary basic architecture diagram for the invention with an IFF interrogator using an omnidirectional antenna only for ISLS.

FIG. 1 schematically illustrates an exemplary basic architecture diagram for the invention with two transceivers, namely an IFF interrogator 1 and an IFF transponder 2. A cylindrical antenna array 3 may be arranged around the mast of a naval ship, hereby not requiring the highest position to maintain an omnidirectional pattern. For example, the antenna 3 may be of the BAE OE-120/UPX type, which comprises a plurality of radiating elements arranged cylindrically. The antenna 3 may provide the interrogator 1 with a sum channel and a delta channel for regular interrogation and monopulse processing. The sum channel may be used by the interrogator 1 on transmit and receive. The delta channel may be used by the interrogator 1 on receive only. The sum and delta channels of the antenna 3 may be directly connected to the interrogator 1, since they are interrogator specific.

The antenna 3 may also provide an additional omnidirectional channel, which may be used by the interrogator 1 to transmit ISLS pulses. Thus, the omnidirectional channel may be connected to an RF switch 4, which may be controlled by the interrogator 1 through an ISLS trigger signal. The ISLS trigger signal may enable to set the RF switch 4 to the interrogator side just before the interrogator 1 sends its ISLS pulse. The omnidirectional pattern required for ISLS pulses may easily be created by exciting all radiating elements of the antenna 3 with equal amplitude and in phase. The RF switch 4 may keep losses at a minimum on transmit. After the ISLS pulse has been sent, i.e. after a certain time has elapsed or the trigger signal has been removed, the RF switch 4 goes back to its default state, which is the side of the transponder 2. Thus, according to the invention, the omnidirectional channel is momentarily used for ISLS transmission by the interrogator 1 and then is completely available for the transponder 2.

It is worth noting that there is no conflict in access to the omnidirectional channel, because the interrogator 1 and the transponder 2 may blank each other by virtue of their respective blanking inputs and outputs, so that the interrogator 1 and the transponder 2 may never try to access the omnidirectional channel for transmission at the same time.

Thus, according to the invention, the omnidirectional channel may be shared by the interrogator 1 on transmit for ISLS and by the transponder 2 on receive and transmit.

Figure 2:
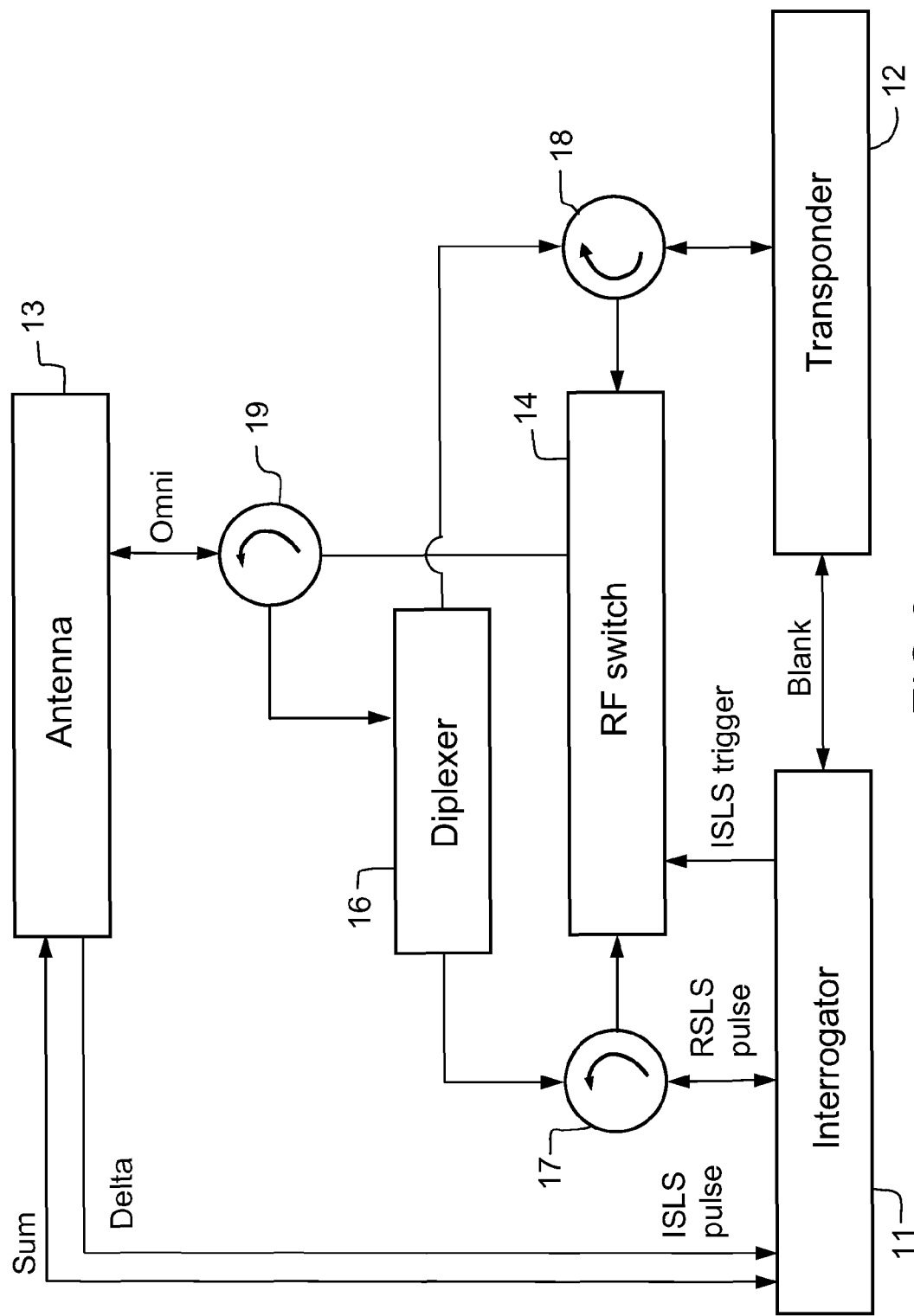
FIG. 2 schematically illustrates an exemplary architecture diagram for the invention with an IFF interrogator using an omnidirectional antenna only for both ISLS and RSLS.

FIG. 2 schematically illustrates an exemplary architecture diagram for the invention with two transceivers, namely an interrogator 11 and a transponder 12. A cylindrical antenna array 13 may be arranged around the mast of a naval ship, hereby not requiring the highest position to maintain an omnidirectional pattern. Compared with the architecture illustrated by FIG. 1, this architecture enables the interrogator 11 to use the omnidirectional channel on receive for RSLS capability. A diplexer 16 may be used to separate the signals on receive. This is possible because the interrogator 11 and the transponder 12 receive at different frequencies, at 1090 MHz and 1030 MHz respectively. Instead of the diplexer 16, a splitter might be used, which would result in additional losses. However, such losses are acceptable on receive. On transmit, an RF switch 14 may keep losses at a minimum.

To isolate transmit signals from receive signals, circulators 17 and 18 may be connected to the interrogator 11 and to the transponder 12 respectively. To isolate transmit signals from receive signals, a circulator 19 may be connected to the antenna 13. However, any other isolation means would be suitable. The circulator 17 may isolate the RF switch 14 from signals coming from the diplexer 16, while concurrently the circulator 18 may isolate the RF switch 14 from signals coming from the diplexer 16 and while concurrently the circulator 19 may isolate the RF switch 14 from signals received by the antenna 13. Alternatively, the circulator 17 may isolate the diplexer 16 from signal transmitted by the interrogator 11, while concurrently the circulator 18 may isolate the diplexer 16 from signals transmitted by the transponder 12 and while the circulator 19 may isolate the diplexer 16 from signals transmitted by the interrogator 11 or from signals transmitted by the transponder 12.

However, the circulators 17 and 18 may be removed if the interrogator 11 and the transponder 12 comprise internal circulators to separate transmit and receive signals. The connections may then be made directly to the transmitter and the receiver of the interrogator 11 and the transponder 12 respectively.

Figure 3:
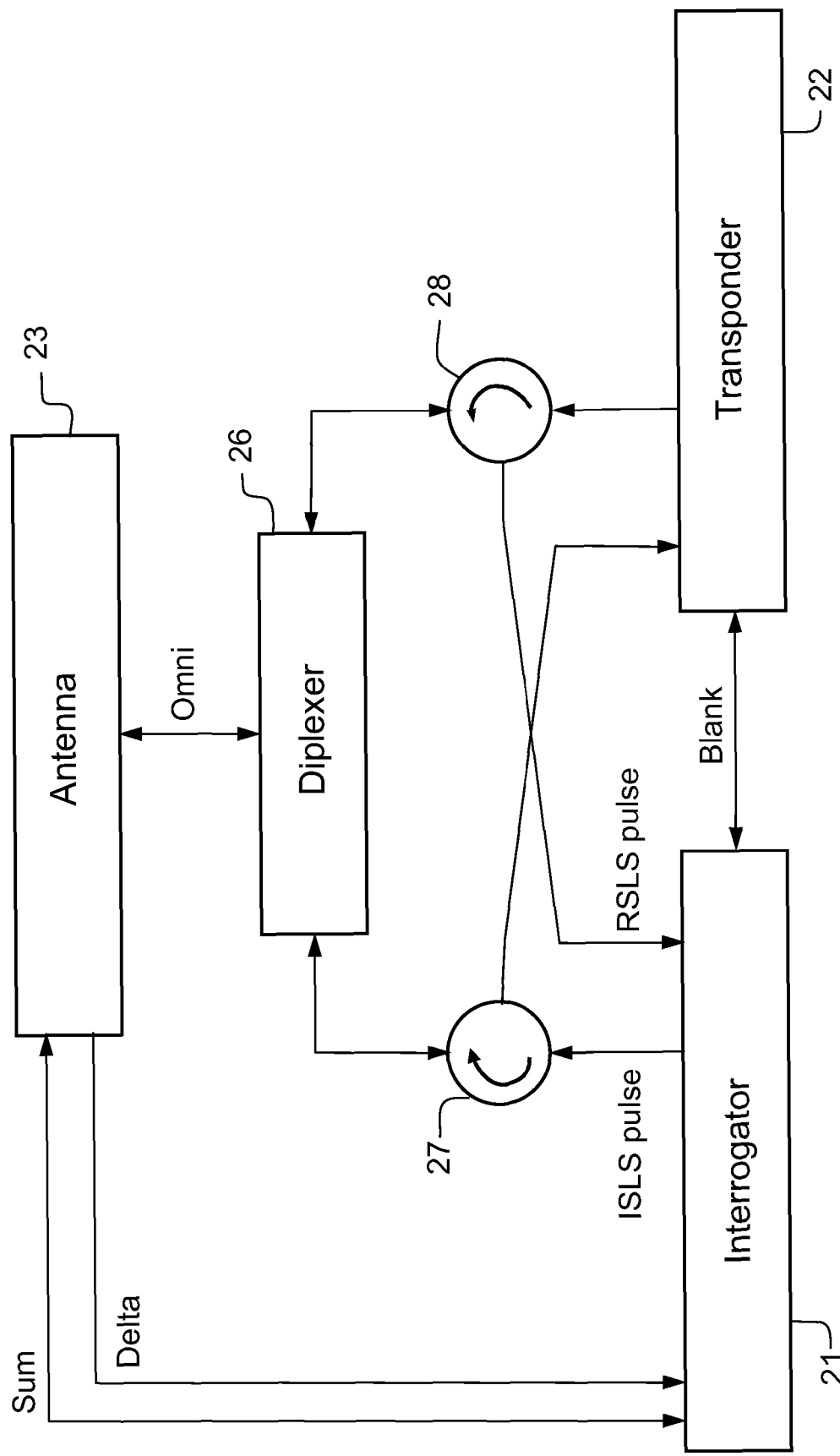
FIG. 3 schematically illustrates another exemplary architecture diagram for the invention with ISLS and RSLS capability for an IFF interrogator.

FIG. 3 schematically illustrates another exemplary architecture diagram for the invention with two transceivers, namely an interrogator 21 and a transponder 22. A diplexer 26 may be used to combine signals on transmit and separate the signals on receive. A cylindrical antenna array 23 may be arranged around the mast of a naval ship, hereby not requiring the highest position to maintain an omnidirectional pattern. To isolate transmit signals from receive signals, circulators 27 and 28 may be connected to the interrogator 21 and to the transponder 22 respectively. Indeed, if the isolation and loss of the diplexer 26 is sufficient, a scheme without RF switch is possible.

The antenna 23 may comprise an omnidirectional channel, a sum channel and a difference channel. The sum and the difference channels of the antenna 23 may be connected directly to the interrogator 21. The diplexer 26 may be arranged so that the omnidirectional channel of the antenna 23 is connected on receive and on transmit to the interrogator 21 and to the transponder 22. On receive, the diplexer 26 may separate signals between the interrogator 21 and the transponder 22. On transmit, the diplexer 26 may merge signals transmitted by the interrogator 21 and the transponder 22 towards the omnidirectional channel of the antenna 23. When the interrogator 21 operates, the circulator 27 may isolate the transponder 22 from signals transmitted by the interrogator 21, while the circulator 28 may isolate the transponder 22 from signals coming from the diplexer 26. When the transponder 22 operates, the circulator 27 may isolate the interrogator 21 from signals coming from the diplexer 26, while the circulator 28 may isolate the interrogator 21 from signals transmitted by the transponder 22. The signals received by the omnidirectional channel of the antenna 23 may be used by the interrogator 21 for RSLS capability. The signals transmitted by the interrogator 21 by virtue of the omnidirectional channel of the antenna 23 may include an ISLS pulse.

Thus, the present invention enables to use a single omnidirectional antenna for both an IFF interrogator and an IFF transponder, without requiring highest position on the naval ship.

The invention claimed is:

1. An apparatus for transmitting and receiving radio-frequency signals, comprising:
   a cylindrical antenna array, which comprises an omnidirectional channel;
   an IFF interrogator connected to the cylindrical antenna array;
   an IFF transponder connected to the cylindrical antenna array;
   wherein the apparatus includes a means for sharing the omnidirectional channel between the IFF interrogator and the IFF transponder, said means having a radio-frequency switch arranged so that the omnidirectional channel is connected on transmit either to the IFF interrogator or to the IFF transponder, the radio-frequency switch connecting the omnidirectional channel on transmit to the IFF transponder by default, the IFF interrogator providing a trigger signal to the radio-frequency switch to be connected on transmit to the omnidirectional channel, the radio-frequency switch switching back to its default state when a predefined time has elapsed or the trigger signal has been removed.

2. The apparatus as claimed in claim 1, wherein the means for sharing the omnidirectional channel between the IFF interrogator and the IFF transponder comprise means for blanking the IFF interrogator when the omnidirectional channel is connected on transmit to the IFF transponder and for blanking the IFF transponder when the omnidirectional channel is connected on transmit to the IFF interrogator.

3. The apparatus as claimed in claim 1, wherein the cylindrical antenna array further comprises a sum channel and a difference channel, the radio-frequency switch being arranged so that the omnidirectional channel is connected on transmit either to the IFF interrogator or to the IFF transponder, the sum and the difference channels being connected directly to the IFF interrogator, the IFF interrogator provides a trigger signal to the radio-frequency switch in order to transmit an ISLS pulse by virtue of the omnidirectional channel.

4. The apparatus as claimed in claim 3, wherein the means for sharing the omnidirectional channel between the IFF interrogator and the IFF transponder further comprises a first, a second and a third circulator arranged so that:
   the first circulator isolates the RF switch from signals coming from the diplexer, while the second circulator isolates the RF switch from signals coming from the diplexer and while the third circulator isolates the RF switch from signals received by the omnidirectional channel; or
   the first circulator isolates the diplexer from signal transmitted by the interrogator, while the second circulator isolates the diplexer from signals transmitted by the transponder and while the third circulator isolates the diplexer from signals transmitted by the interrogator or from signals transmitted by the transponder.

5. The apparatus as claimed in claim 3, wherein the cylindrical antenna array is arranged around the mast of a naval ship.

6. The apparatus as claimed in claim 1, wherein the means for sharing the omnidirectional channel between the IFF interrogator and the IFF transponder further comprises a diplexer arranged so that the omnidirectional channel is connected on receive to the IFF interrogator and to the IFF transponder, the diplexer separating signals received by the omnidirectional channel between the IFF interrogator and the IFF transponder.

7. The apparatus as claimed in claim 6, wherein the cylindrical antenna array further comprises a sum channel and a difference channel, the diplexer being arranged so that the omnidirectional channel is connected on receive to the IFF interrogator and to the IFF transponder, the sum and the difference channels being connected directly to the IFF interrogator, the signals received by the omnidirectional channel being used for RSLS processing by the IFF interrogator.

8. The apparatus as claimed in claim 7, wherein the means for sharing the omnidirectional channel between the IFF interrogator and the IFF transponder further comprises a first, a second and a third circulator arranged so that:
   the first circulator isolates the RF switch from signals coming from the diplexer, while the second circulator isolates the RF switch from signals coming from the diplexer and while the third circulator isolates the RF switch from signals received by the omnidirectional channel; or
   the first circulator isolates the diplexer from signal transmitted by the interrogator, while the second circulator isolates the diplexer from signals transmitted by the transponder and while the third circulator isolates the diplexer from signals transmitted by the interrogator or from signals transmitted by the transponder.

9. The apparatus as claimed in claim 7, wherein the cylindrical antenna array is arranged around the mast of a naval ship.

10. The apparatus as claimed in claim 1, wherein the means for sharing the omnidirectional channel between the IFF interrogator and the IFF transponder further comprises:

a diplexer arranged so that the omnidirectional channel is connected on receive and on transmit to the IFF interrogator and to the IFF transponder, the diplexer separating signals received by omnidirectional channel between the IFF interrogator and the IFF transponder, the diplexer merging signals transmitted by the IFF interrogator and the IFF transponder towards the omnidirectional channel;

a first and a second circulator arranged so that:
- the first circulator isolates the IFF transponder from signals transmitted by the IFF interrogator, while the second circulator isolates the IFF transponder from signals coming from the diplexer; or
- the first circulator isolates the IFF interrogator from signals coming from the diplexer, while the second circulator isolates the IFF interrogator from signals transmitted by the IFF transponder.

11. The apparatus as claimed in claim 10, wherein the cylindrical antenna array further comprises a sum channel and a difference channel, the diplexer being arranged so that the omnidirectional channel is connected on receive and on transmit to the IFF interrogator and to the IFF transponder, the sum and the difference channels being connected directly to the IFF interrogator, the signals received by the omnidirectional channel being used for RSLS processing by the IFF interrogator and the signals transmitted by the IFF interrogator by virtue of the omnidirectional channel include an ISLS pulse.

12. The apparatus as claimed in claim 11, wherein the cylindrical antenna array is arranged around the mast of a naval ship.

* * * * *